(No Model.)

J. BEESLEY.
CLASP.

No. 465,012.  Patented Dec. 15, 1891.

WITNESSES
G. H. Clark
W. H. James

INVENTOR.
Per John Beesley
Robt. 3d. Phillips
Attorney.

UNITED STATES PATENT OFFICE.

JOHN BEESLEY, OF COVENTRY, ENGLAND.

CLASP.

SPECIFICATION forming part of Letters Patent No. 465,012, dated December 15, 1891.

Application filed August 17, 1891. Serial No. 402,945. (No model.) Patented in England February 19, 1891, No. 3,054.

*To all whom it may concern:*

Be it known that I, JOHN BEESLEY, a subject of the Queen of Great Britain, residing at Coventry, in the county of Warwick, England, have invented a new and useful Improvement in Clip-Brackets, (for which I have conjointly with others obtained a patent in Great Britain, No. 3,054, bearing date February 19, 1891,) of which the following is a specification.

My invention relates to a clip-bracket for attaching bells, luggage-carriers, and other adjuncts or fittings to the handle-bars or other parts of velocipedes; and it consists of a hollow bracket, into which a block carrying a flexible band is drawn by a screw, thereby contracting the area within the band and so causing it to grip whatever is within it, the object being to obtain a simple and reliable clip embodying the following essential features: first, capability of gripping a part of any diameter or size within reasonable limits; secondly, capability of gripping a part of any shape or section, and, thirdly, obtaining a sufficiently-tight grip on the part gripped with such a small expenditure of power that the fingers only may be used without the aid of a spanner or wrench. I attain this end in the manner illustrated in the accompanying drawings, in which—

Figure 2:
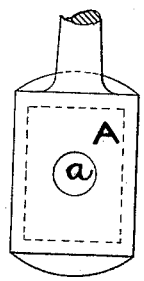
Figure 1:
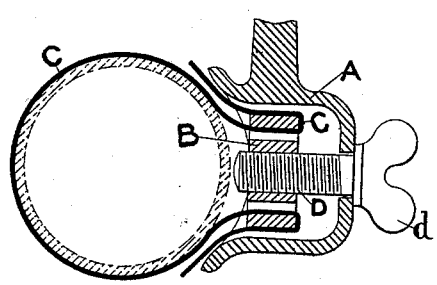
Figure 3:
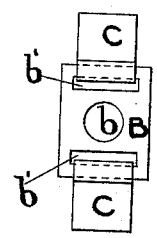
Figure 4:
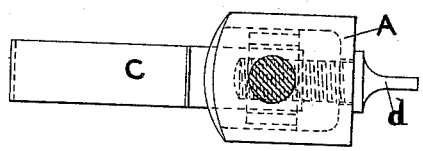
Figure 5:
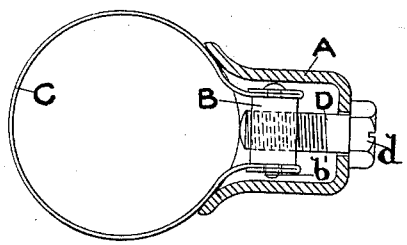

Figure 1 is a view in side elevation, partly in section, of my improved clip-bracket. Fig. 2 is a view thereof in plan. Fig. 3 is a view in end elevation of the sliding block, showing the method of attaching the flexible band thereto; and Fig. 4 is a view in end elevation of the bracket. Fig. 5 is a view showing another form my invention may assume, and Fig. 6 is a view in plan of my improved clip-bracket as adapted to carry a foot-rest for attachment to the side of a fork.

Throughout the several views similar parts are marked with like letters of reference.

Figure 6:
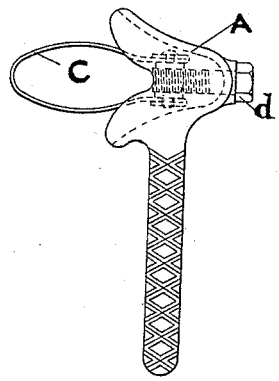

The bracket A is either formed to receive the fitting or adjunct it is intended to support, or it is formed as part of the said fitting, as illustrated by Fig. 6 of the accompanying drawings. The bracket A is formed hollow to receive a sliding block B, to which is connected the two ends of a flexible band C, of steel or any other suitable metal or material. The block B is drawn into the hollow bracket A by a screw D, which passes through a hole $a$ in the bracket A and screws into a hole $b$ in the block B. The head $d$ of the screw D may be either shaped to allow it to be operated by the fingers, as illustrated by Figs. 1 and 2 of the accompanying drawings, or shaped to permit of its being operated by a spanner or screw-driver, as shown by Figs. 5 and 6 of the accompanying drawings. The flexible band C may be attached to the block B by passing its free ends through holes $b'\,b'$, formed in the said block, and turning its ends down over the sides of the block, as shown by Figs. 1 and 2 of the accompanying drawings, or it may be attached to the block B by means of small pegs or pins $b'\,b'$, fixed to the sides of the said block and adapted to engage with holes formed in the free ends of the band C, as shown by Figs. 5 and 6 of the accompanying drawings. I prefer to use the former arrangement, as any flexible band can then be used without preparation; but for adjuncts or fittings adapted to be fixed to parts the diameters of which are known or approximately known I prefer to use the latter arrangement, in which case I prefer to rivet over the head of one of the pegs or pins $b'$, and so fix one end of the band C to the block B, allowing the other end to be capable of detachment therefrom, to allow of its being placed round the part to be gripped. As anything in the form of a flexible band can be used in my improved clip, it will be seen that the band can easily be replaced should it break from any cause.

My improved clip-bracket may be used for all purposes for which such a device is applicable, and I do not limit its use to that hereinbefore specially set forth.

I wish it to be particularly understood that I do not limit myself to the precise details of construction hereinbefore set forth; but that I hold myself at liberty to make such changes and alterations as fairly fall within the spirit and scope of my invention.

Having now particularly described and ascertained the nature of my said invention and in what manner the same is to be performed, I declare that what I claim is—

1. The improved clip-bracket consisting, essentially, of a flexible band attached by both ends to a block, a bracket carrying the adjunct or fitting and embracing the block carrying the flexible band, and a traversing screw threaded into the said block and bearing on the bracket fitting over it, so that its rotation causes the band to be tightened round the part it embraces, as set forth.

2. In a clasp, the combination of a bracket formed on or fixed to the adjunct or fitting it is intended to carry, and shaped to fit over and bear on the part the clasp is intended to grip, a block sliding within the said bracket, a screw bearing on the said bracket and threaded into the said sliding block so as to operate it, and a flexible band adapted to be placed round the part to be gripped and to be drawn up within the bracket carrying the adjunct or fitting, as and for the purpose set forth.

3. In a clip-bracket, the combination of the flexible band C, the bracket A, adapted to carry the adjunct or fitting, the block B, having a central hole $b$ and two side holes $b'\,b'$ adapted to receive the ends of the flexible band C, and the traversing screw D, passing through a hole $a$ in the bracket A and engaging with the hole $b$ in the block B, which is threaded to receive it, all combined, arranged, and operating as and for the purpose set forth.

4. In a clip-bracket, the combination of the traversing screw D, the bracket A, adapted to carry the adjunct or fitting, the block B, having a central hole $b$, threaded to receive the screw D, and two pegs or pins $b'\,b'$, and the flexible band C, having holes at its free ends adapted to engage with the pegs or pins $b'\,b'$ on the block C and so attach the band to the said block, all combined, arranged, and operating as and for the purpose set forth.

JOHN BEESLEY.

Witnesses:
CLARKSON BOOTH,
PERCY HERBERT RAY.